United States Patent
Robson

Patent Number: 5,889,893
Date of Patent: Mar. 30, 1999

[54] METHOD AND APPARATUS FOR THE FAST ROTATION OF AN IMAGE

[75] Inventor: Thomas Robson, Penfield, N.Y.

[73] Assignee: Xerox Corporation, Stamford, Conn.

[21] Appl. No.: 624,044

[22] Filed: Mar. 27, 1996

[51] Int. Cl.[6] .............. G06K 9/32; G09G 5/04; H04N 9/74; H04N 1/419

[52] U.S. Cl. .............. 382/296; 382/293; 382/297; 345/126; 348/583; 358/261.1

[58] Field of Search ................ 382/235, 293, 382/297, 296; 358/426, 427, 261.1; 345/126; 348/583

[56] References Cited

U.S. PATENT DOCUMENTS

| | | | |
|---|---|---|---|
| 3,812,336 | 5/1974 | Bossen et al. | 371/2.2 |
| 4,307,958 | 12/1981 | McIrvine | 355/23 |
| 4,453,841 | 6/1984 | Bobick et al. | 400/126 |
| 4,460,959 | 7/1984 | Lemay et al. | 395/445 |
| 4,893,187 | 1/1990 | Tsujimoto et al. | 358/261.1 |
| 4,935,897 | 6/1990 | Kurihara et al. | 365/189.05 |
| 5,012,434 | 4/1991 | Zietlow et al. | 364/523 |
| 5,245,441 | 9/1993 | Ruben | 358/426 |
| 5,504,591 | 4/1996 | Dujari | 358/426 |

Primary Examiner—Bipin Shalwala
Assistant Examiner—Daniel G. Mariam

[57] ABSTRACT

The present invention is a method and apparatus for the fast rotation of binary images represented as a run length encoded data stream. The system employs a cache memory for efficiently representing parsed RLE data in a rotated orientation, where only the white-black transition points are recorded. Subsequently, the cache memory is further processed using a logic operation to fill in the runs between the recorded transition points during concurrent transfer of the image data to a band of page buffer memory. The process is repeated for a plurality of bands to complete the rotation/decoding process for an entire bitmap image.

7 Claims, 6 Drawing Sheets

METHOD AND APPARATUS FOR THE FAST ROTATION OF AN IMAGE

This invention relates generally to an image processing system, and more particularly to a method and apparatus for the fast rotation of binary images employing a run length encoded representation thereof.

CROSS REFERENCE

The following related applications are hereby incorporated by reference for their teachings:

"METHOD AND APPARATUS FOR THE FAST SCALING OF AN IMAGE," Thomas Robson, Application Ser. No. 08/622,781, filed Mar. 27, 1996 now U.S. Pat. No. 5,867,612, and "METHOD FOR CONVERTING CCITT COMPRESSED DATA," Thomas Robson, Application Ser No. 08/161,492, filed Dec. 6, 1993 now U.S. Pat. No. 5,090,088.

COPYRIGHT NOTIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The present invention is directed to image rotation. As will be appreciated, rotation of an image is a fundamental element of an image processing system, be it a dedicated image processing system or one that is part of a digital printer, facsimile machine, or multifunction device. The present invention is directed to a high speed method and apparatus for accomplishing the orthogonal rotation of digitized images that are represented in a run length encoded manner.

Heretofore, a patent has disclosed a general method for image rotation, the relevant portion of which may be briefly summarized as follows:

U.S. Pat. No. 5,111,514 to Ohta, issued May 5, 1992, teaches a digital image forming apparatus that may be employed to rotate characters so as to align them. In FIG. 35 and at col. 14, lines 1–25, Ohta discloses a method of character image rotation by extracting the run length data for one character image in a main scanning direction and converting it into a sub scanning direction.

In accordance with the present invention, there is provided a method, operating on a programmable data processing system, for rotating an image represented as a run length encoded data stream while decoding the run length encoded data stream, comprising: (a) resetting, in a memory associated with the data processing system, a plurality of contiguous memory locations to zero; (b) setting, in response to the run length encoded data stream, each bit in the contiguous memory indicating a beginning of each of a plurality of runs of a continuous color, wherein the bits set are ordered in a direction orthogonal to a direction in which the run length encoded data stream was encoded; and (c) resetting a register to zero; (d) exclusive ORing the contents of the register with a selected word in the contiguous memory; (e) writing the contents of the register to the selected word in the contiguous memory; and (f) selecting an immediately following contiguous memory location as the selected word and repeating steps (d) and (e) until all contiguous memory locations have been processed.

In accordance with another aspect of the present invention, there is provided apparatus for rotating a run length encoded data stream while decoding the same, comprising: a buffer for storing at least a portion of the run length encoded data stream; a cache memory comprising a plurality of contiguous memory locations; decoding means for determining the length of a run of pixels encoded in a first direction; means, responsive to the length of the run determined by said decoding means, for setting a bit in a word and bit location of said cache memory, wherein the word and bit location are determined as a function of the run length and the determined length of the run of pixels; means for EXCLUSIVE ORing a first of the contiguous memory locations with zero and writing the result thereto; means for successively EXCLUSIVE ORing each contiguous memory location with an immediately preceding contiguous memory location and writing the result to the contiguous memory location until all of the contiguous memory locations have been so processed, where the contiguous memory locations represent the rotated and decompressed image.

In accordance with yet another aspect of the present invention, there is provided a method, operating on a programmable data processing system, for rotating an image represented by a run length encoded data stream, comprising: receiving the run length encoded data stream; parsing the run length encoded data stream to determine a length of each of a plurality of runs of a continuous color; writing to a memory, in a direction orthogonal to a direction in which the run length encoded data stream was encoded, data indicating only the beginning of each of the plurality of runs of a continuous color; and repeatedly applying a logic operation to said memory to decode the run length encoded data stream in a rotated fashion.

One aspect of the invention deals with a basic problem in image processing, the fast rotation of image bitmaps. Resolution of this problem finds practical application in various image output devices where an image generated in a first orientation is constrained to be printed in an orthogonal orientation. For example, an image may be generated or scanned in a long-edge feed orientation (landscape) but printed in a short-edge feed (portrait) orientation.

This aspect is further based on the discovery of an efficient processing technique that alleviates this problem. The technique employs the compressed form of an image when it has been represented as a run length encoded bit stream to accomplish the orthogonal rotation in a computationally efficient manner. In particular, a preferred embodiment of the invention relies upon a fast rotation technique where a contiguous memory caching system is employed to facilitate the rapid rotation of the image while run length decoding the image data.

This technique can be implemented, for example, by any image processing system, be it hardware or software based. Machines implementing the invention may include printers, scanners, facsimile machines as well as multifunction machines. The hardware required preferably includes a fast cache memory and a microprocessor or similar control circuitry to control memory access (e.g., read/write) and to perform simple logic operations on the stored data.

The technique described above is advantageous because it is not only simple but efficient. The technique of the present invention avoids bit-wise processing in favor of processing run length encoded information. Furthermore, it can be adapted to any image processing system in which run length encoded data is generated or employed, making it available for use in any of a number of digital image processing systems, particularly those using run length encoding for data compression. The techniques of the invention are advantageous because they permit the highly efficient orthogonal rotation of image bitmaps. The present invention is one of a plurality of image processing operations that can be applied to compressed image formats to enable faster processing of image data in an image processing system. Some of the related techniques can be used to perform image processing while decoding a run length encoded image.

Figure 1:
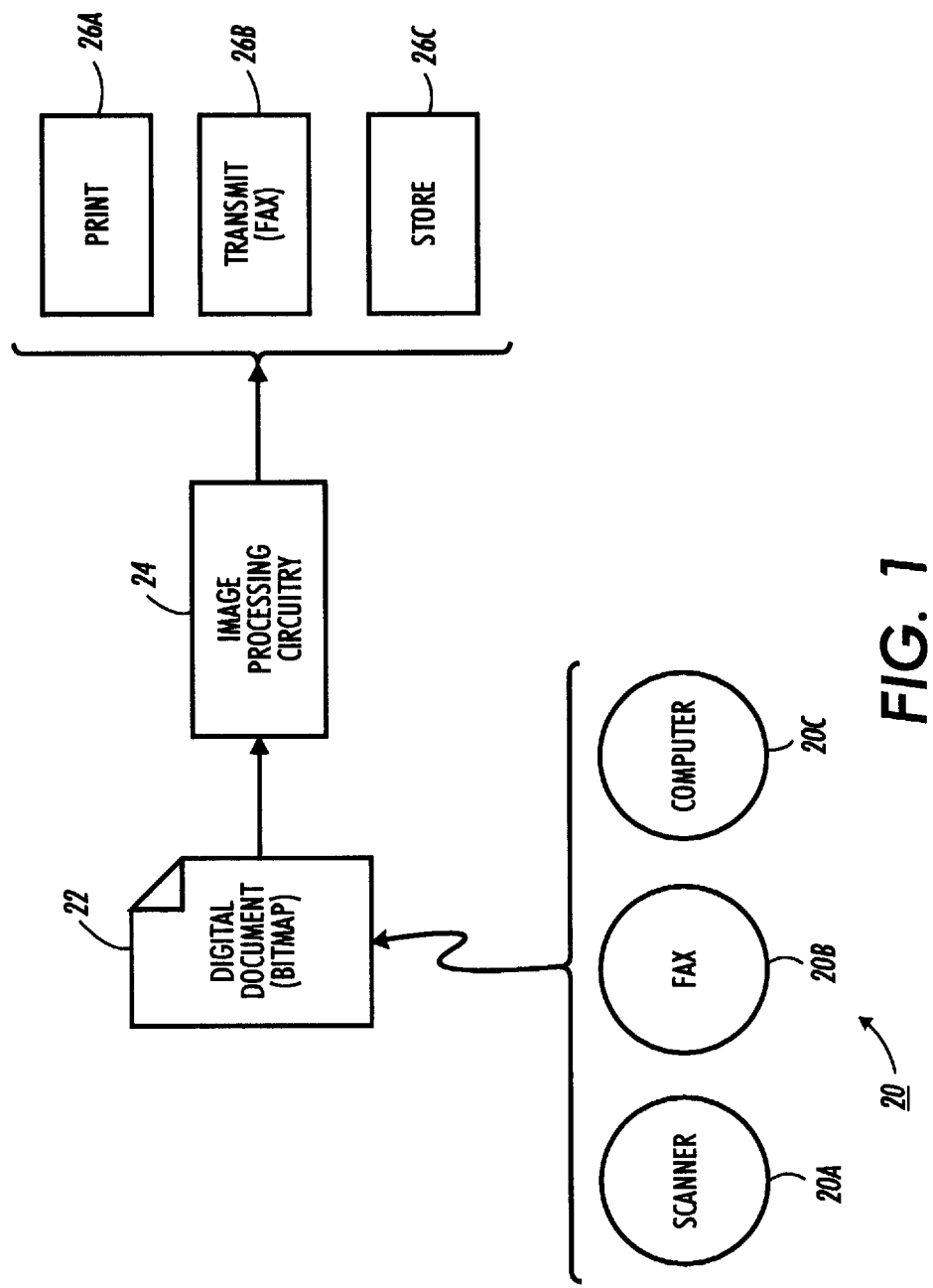
FIG. 1 is a general block diagram illustrating a possible embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings and the Software Appendix included herein. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

A "multi-bit" item of data is an item of data that includes more than one bit. For example, a "Word" is a multi-bit item of data that can be accessed or otherwise operated on as a unit. For the purposes of the present description, a word is represented herein as a 32-bit item of data.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location. "Image processing circuitry" is circuitry designed and intended primarily for carrying out operations on data that is representative of an image (e.g., image signals or pixels). A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium. "Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value. A "data processing system" is a physical system that processes data. A "data processor" or "processor" is any component or system that can process data, and may include one or more central processing units or other processing components. The terms "coprocessor" and "host processor" are complementary terms. A "host processor" is capable of operating independently but it can also be connected to a "coprocessor" so that the host processor and the coprocessor operate in an interdependent manner.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "operates on" an item of data by performing an operation that includes obtaining a resulting item of data that depends on the item of data operated on. For example, the resulting item of data could result from an operation that accesses the item of data operated on or from a logic or arithmetic operation on the item of data operated on. A "logic operation" is an operation that obtains one bit using each bit of an operand independent of values of other bits of the operand. NOT is an example of a logic operation that uses one operand. OR, AND, and XOR are examples that use two or more operands.

An "address" is an item of data that can be used to address a memory cell within memory circuitry that includes plural memory cells.

An "instruction" is an item of data that a processor can use to determine its own operation. A processor "executes" a set of instructions when it uses the instructions to determine its operations.

To "obtain" or "produce" an item of data is to perform any combination of operations that begins without the item of data and that results in the item of data.

An operation "encodes" items of data when performing the operation on the items of data produces different items of data from which the encoded data items can subsequently be recovered. The operation that recovers the encoded data items is "decoding."

"Code" means data indicating instructions, but in a form that a processor can execute.

A "sequence" or "subsequence" of items of data is a set of items that a processor can access in sequence; in other words, once the first item in a sequence or subsequence has been accessed, each subsequent item can be accessed after accessing previous items in the sequence or subsequence. For example, contiguous memory locations may be accessed in sequence by incrementing an item of data representing a memory address.

An "array of data" or "data array" or "array" is a combination of items of data that can be mapped into an array. A "two-dimensional array" is a data array whose items of data can be mapped into an array having two dimensions. A "pixel" is the smallest segment into which an image is divided in a given system. In an array defining an image in which each item of data provides a value, each value indicating the color of a location may be called a "pixel value". Each pixel value is a bit in a "binary form" of an image, a gray scale value in a "tray scale form" of an image, or a set of color space coordinates in a "color coordinate form" of an image, the binary form, gray scale form, and color coordinate form each being a two-dimensional array defining an image.

An operation performs "image processing" when it operates on an item of data that relates to part of an image.

An "image input terminal" (IIT) or "image input device" is a device that can receive an image and provide an item of data defining a version of the image. A "scanner" is an image input device that receives an image by a scanning operation, such as by scanning a hard copy document. An "image output device" (IOT) is a device that can receive an item of data defining an image and provide the image as output. A "display" is an image output device that provides the output image in human viewable form. The visible pattern presented by a display is a "displayed image" or simply "image."

Turning now to FIG. 1, displayed therein is a general image processing system as would be suitable for an embodiment of the present invention. In particular, FIG. 1 illustrates a plurality of image input terminals (IITs) represented by scanner 20a, facsimile device 20b or computer 20c. It will be appreciated by those skilled in the art that numerous IITs may be employed as the source of a digital document 22. Digital document 22 is preferably a bitmap array of image data. In the embodiment depicted, the image data forming the digital document is processed by image processing circuitry 24 in order to produce output data (not shown) capable of driving or controlling the rendition of an image on one of the plurality of well-known image output terminals (IOTs) represented with reference numerals 26a, 26b and 26c. It will be further appreciated that image processing circuitry 24 may be dedicated circuitry including memory and logic elements suitable for accomplishing a desired operation on image data, or it may embody a commercially available data processing system having memory, logic and control elements therein programmed in a manner to accomplish the desired operations.

However, in any embodiment, the image processing circuitry 24 must be capable of performing operations on data words comprising a plurality of bits, for example, 32 or 64 bits.

Figure 2:
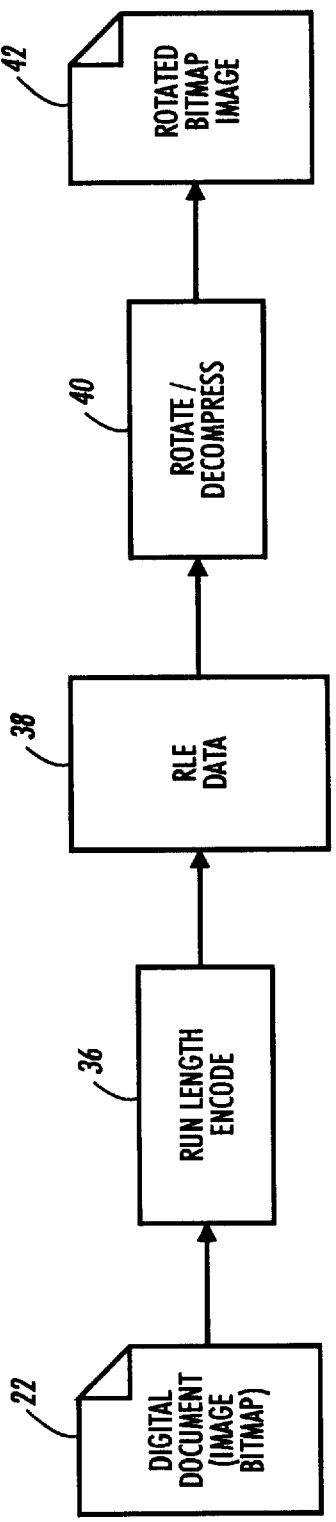
FIG. 2 is a data flow diagram representing the inputs and outputs of the essential components of the present invention.

Building on the embodiment of FIG. 1, FIG. 2 illustrates in more detail the data flow of an aspect of the present invention. Bitmap data from digital document 22 is passed through a run length encoder 36 to produce the run length encoded data stream represented by data object 38. It will be appreciated that the present invention operates on run length encoded information and that there are a number of methods and techniques for obtaining such information. The process of run length encoding (RLE) is well-known as demonstrated by RLE employed in CCITT Group 3 and Group 4 compression, by Huffman-type encoding and by other similar RLE methods as described, for example, by J. D. Murray and W. vanRyper in *Encyclopedia of Graphic File Formats*, July 1994, O'Reilly & Assoc., the relevant portions of which are hereby incorporated by reference for their teachings concerning run length encoding. Having the RLE data 38, the present invention operates to both rotate and decompress in a computationally efficient manner, as depicted by operation 40, to produce a rotated bitmap image represented by data object 42 in FIG. 2.

Figure 3:
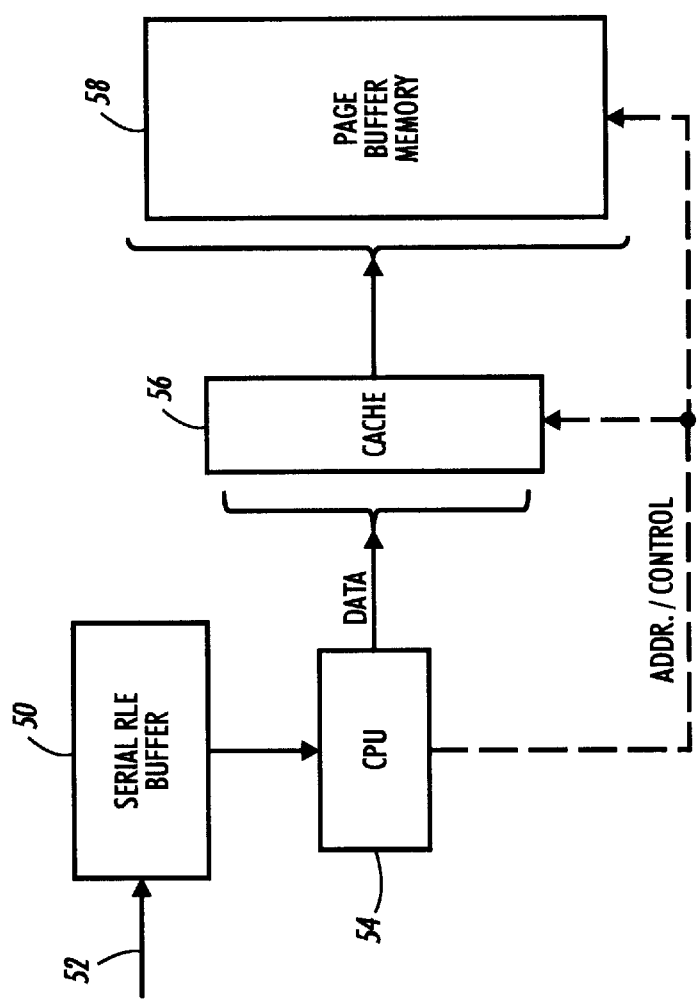
FIG. 3 is a detailed block diagram illustrating the various components with a computer system capable of implementing the present invention.

Having generally described an image processing embodiment and the operation of the present invention, attention is now turned to FIG. 3, where a preferred hardware embodiment for the present invention is illustrated. As shown therein, RLE data 38 of FIG. 2 is received into serial RLE buffer 50 via line 52. The RLE data is then be supplied to a processor, represented as CPU 54, where it is parsed or interpreted as will be described hereafter, to produce data that is written to a cache memory 56.

As will be appreciated by those skilled in the design of digital data processing systems, the performance of the system depicted in FIG. 3 may depend upon the characteristics of the CPU, cache memory and any bus or logic circuitry employed to transfer or process data present within the system. In a preferred embodiment, CPU 54 is an Intel Pentium®, Pentium Pro, or Sun SPARC-station. Similarly, cache memory 56 is preferably comprised of SRAM or similar memory circuitry capable of read/write access with minimal access times under the control of CPU 54 or a direct memory access component. Cache memory 56 includes a plurality of contiguous memory locations that may be accessed sequentially by indexing a pointer maintained as an address register (not shown) or similar memory value. Once written to cache memory 56, the data is further processed using logical operations and then transferred to a page buffer memory 58 in "bands", where the width (in bits) of the bands is preferably determined by the width (also in bits) of the cache memory or the maximum size of a word that can be accessed by the CPU—presently 32-bit and likely 64-bit for next generation computing hardware.

Figure 4:
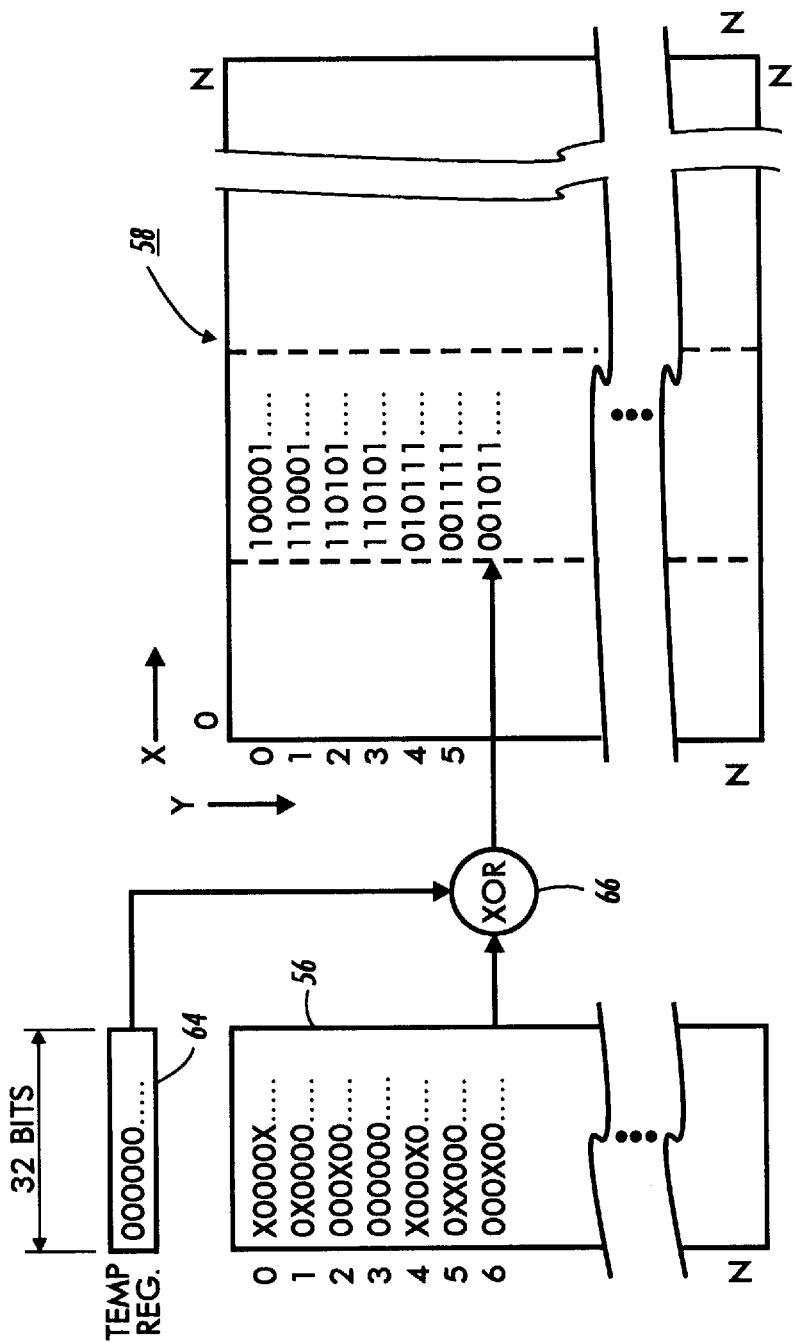
FIG. 4 is an exemplary representation of the data as stored in the memory components depicted in FIG. 3.
Figure 5:
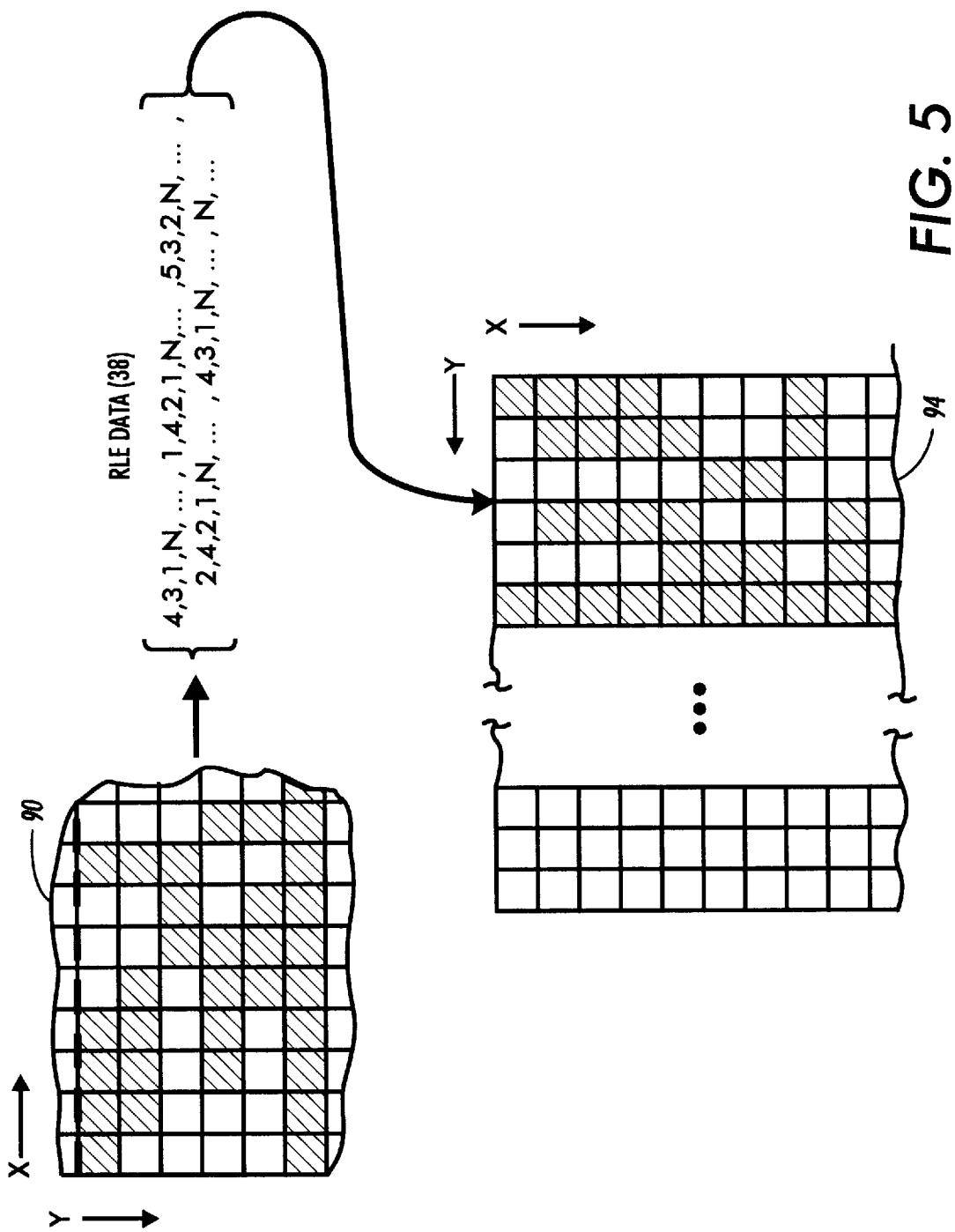
FIG. 5 an illustrative example of the manner in which the run length encoded information is processed to accomplish image rotation in conjunction with run length decoding in accordance with the present invention and as previously described with respect to FIG. 4.

Referring next to FIG. 4 in conjunction with FIG. 5, there are described the details of the memory structure and hardware employed to accomplish the present invention. In a preferred embodiment, the hardware components of FIG. 4 are controlled by a set of preprogrammed instructions. The instructions are generated as a result of the compilation of the software source code found in the Software Appendix for either clockwise or anti-clockwise rotations. In operation, CPU 54 operates to perform the preprogrammed instructions so as to process the run length encoded data as illustrated in FIG. 4. For example, beginning with a portion of a binary bitmap, as seen in image segment 90 of FIG. 5 where shaded regions represent black pixels, a stream of RLE data 38 is produced and provided to the system of FIG. 3. As described above, the CPU receives the RLE data from the buffer and parses the data to identify the sizes of the alternating black and white run lengths. As FIG. 4 illustrates in detail, the parsed RLE data is then employed to place a mark (shown as an "X") in each bit location in the cache memory where a transition between black and white runs occurs. In more detail, each line of RLE data is parsed to place a binary "mark" or a "1" in those bit locations corresponding to the scanline number and its pixel offset from the beginning of the scanline. For example, the RLE data of FIG. 5 shows a first run of four black pixels. To represent this run, a 1 is placed in the cache memory in the 31st pixel position of the 0th word and a 1 is placed in the 31 st pixel position of the 4th word. In a preferred embodiment, the present invention employs a 32-bit wide cache memory, so that only 32 scanlines of RLE data may be processed at one time. However, there is no intent to specifically limit the present invention to a specific number of bits within the cache memory. Furthermore, it may be possible to directly fill the page buffer memory and then further process the data within the page buffer memory as will be described with respect to the cache memory 56. It will also be appreciated that rotation of the first run of four black pixels in the anti-clockwise direction is accomplished by placing a 1 in the cache memory in the 0th pixel position of N-3th word and then processing as described below.

As will be appreciated by those skilled in the art, CPU 54 is a 32-bit processor, and the present invention takes advantage of the word-wise processing of binary image information. As a result the processing operations described herein are more efficient than the processing on a bit-by-bit basis to accomplish image rotation. Furthermore, by simply "marking" the changed bits within the cache memory 56, the number of times bit-wise writing operations are performed is reduced and the subsequent logic operations are also performed on a word-wise basis to improve the efficiency.

Once the 32 scanlines of RLE data has been parsed and the binary marks placed in the appropriate locations of the contiguous 32-bit words, the data stored in the cache memory is further processed to complete the rotation and run length decoding. More specifically, temporary register 64 is first zeroed to fill all 32 bits therein with a binary 0. Once zeroed, the temporary register is then logically EXCLUSIVE ORed (XOR) with the first contiguous memory location (word 0) cache memory 56 as represented by XOR block 66 in FIG. 4. The result of the XOR logic operation is then found in temporary register 64 and is written to the appropriate location in page buffer memory 58. Subsequently, the XOR operation is repeated, in sequence, for each of the remaining contiguous memory locations, each time the resultant value in the temporary register being written into a unique location of the page buffer memory. As is illustrated in the data depicted in page buffer memory 58, the binary "marks" found in the cache memory are transformed into binary runs of black (1) and white (2) bits in the page buffer memory 58. Moreover, as represented in FIG. 5, the resultant bitmap image is as depicted in image segment 94—an orthogonal rotation of image segment 90.

Figure 6:
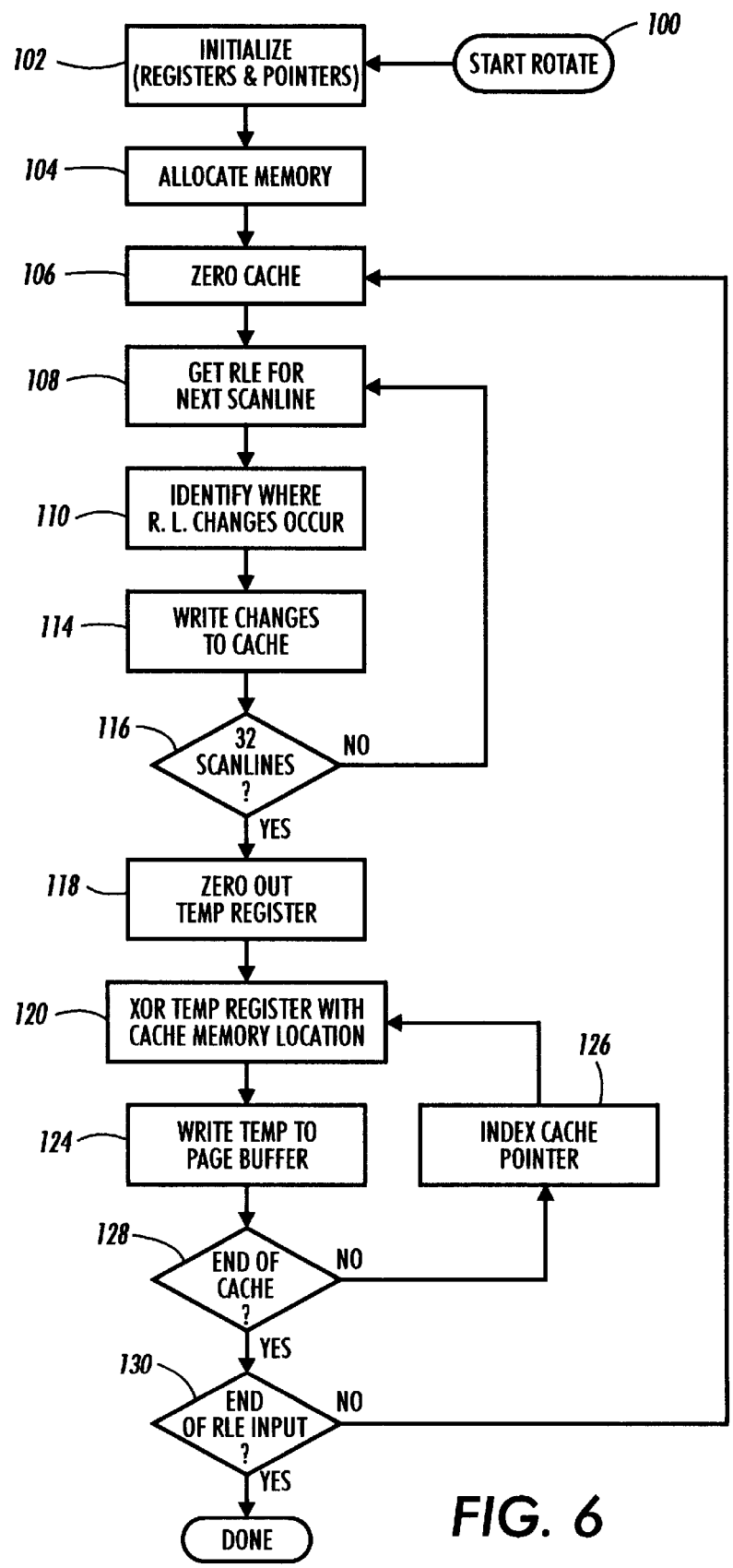
FIG. 6 is a detailed flow chart illustrating the various steps that are executed for accomplishing the present invention in the hardware embodiment depicted in FIG. 3.

Having described the operation of a hardware embodiment of the present invention, attention is now turned to FIG. 6 which will be used in conjunction with reference to the Software Appendix to describe the exemplary operation of the preferred embodiment in detail. Initially, the clockwise rotation operation starts at step 100, by a call to the rotate( ) code module found in the Appendix. The module would first initialize all variables employed therein, including a series of pointers to manage the memory access operations, step 102. Once initialized, memory allocation is accomplished at step 104 and the cache memory is reset to all "0"'s at step 106. At step 108, a portion of the RLE data is retrieved, preferably sufficient RLE data can be buffered so as to contain data for a complete scanline.

Once the RLE data is available, it is parsed or otherwise interrogated to identify the positions along the scanline where the black-white transitions occur. Details of this operation can be found in the getChanges( ) routine found in the Appendix. The transition points, once determined at step 110, are then recorded in cache memory at step 114. When a scanline of RLE data is completed, the process returns to step 108 where it is repeated to fill in each of the bit columns of the 32-bit words in the cache memory. Completion of the 32 scanlines of RLE data is monitored at step 116. Once the parsing and writing to cache has been completed, processing continues at step 118, where the temporary register is reset to zero, and then at step 120 where the first word of the cache memory is XORed with the temporary register.

At step 124, the result of the XOR operation, found in the temporary register, is then written to an associated location in the page buffer memory. The process at steps 120 and 124 is repeated for each of the plurality of contiguous memory locations in the cache memory under the control of the cache pointer indexing step 126 and test block 128. As will be appreciated, the cache memory is preferably of a size sufficient to accommodate a word for each pixel position along the scanline. Alternatively, a smaller cache buffer may be employed and the process adjusted to account for the fewer number of contiguous memory locations, recognizing that additional processing steps may be necessary to adjust pointers. Upon reaching the end of the cache memory, completing a band of 32 scanlines, the processing continues at step 130 where a test is executed to determine if additional RLE data is available for more scanlines. If so, processing continues at step 106, otherwise, the rotation and run length decoding is complete.

In recapitulation, the present invention is a method and apparatus for the fast rotation of binary images represented as a run length encoded data stream. The system employs a cache memory for efficiently representing parsed RLE data in a rotated orientation, where only the white-black transition points are recorded. Subsequently, the cache memory is further processed using a logic operation to fill in the runs between the recorded transition points during concurrent transfer to a band of page buffer memory. The process is repeated for a plurality of bands to complete the rotation/decoding process for an entire bitmap image.

It is, therefore, apparent that there has been provided, in accordance with the present invention, a method and apparatus for the fast rotation of run length encoded binary images. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

SOFTWARE APPENDIX

```c
#include <stdio.h>
include "improc.h"
#define fMask1bit 0xaaaaaaaa
#define sMask1bit 0x55555555
#define fMask2bit 0xcccccccc
#define sMask2bit 0x33333333
#define fMask4bit 0xf0f0f0f0
#define sMask4bit 0x0f0f0f0f
#define SWAPWORD(wrd)
image imageMalloc();
image imageMallocZero();
void render();

rotate1(imageIn,imageOut,error)
image *imageIn;
image * imageOut;
errorType *error;
{
    FILE * fdlocs;
    unsigned char *ipAdd;
    unsigned char *opAdd;
    unsigned char *inputBuff,*outputBuff,*ptr;
    int ipScanLines;
    unsigned int ipRow,ipColumn,opRow,opColumn,ipRows,ipColumns;
    unsigned int opScanBytes;
    unsigned int ipScanBytes,startLines;
/*    if(imageIn->bitsPerPixel!=1)
    {
        rotateAntiClockGrey(imageIn,imageOut,error);
        return;
    }*/
    ipScanBytes=rnd32(imageIn->lineLength)/8;
    ipScanLines=((imageIn->lines+31)/32)*32;
    inputBuff=(unsigned char *)(imageIn->buffer);

for(ptr=inputBuff+(imageIn->lines)*ipScanBytes;ptr<inputBuff+
        ipScanBytes*ipScanLines;ptr++)
            *ptr=0;
    opScanBytes=ipScanLines/8;
    ipRows=(ipScanLines+31)/32;
    ipColumns=(ipScanBytes+3)/4;
    *imageOut=imageMalloc(imageIn->lineLength,ipScanLines,error);
    if (*error!=ERROR_OK) return;
    outputBuff=(unsigned char *)(imageOut->buffer);
    imageClear(imageOut);
    imageOut->resolution=imageIn->resolution;
    imageOut->orientation=imageIn->orientation;
    for(ipRow=0;ipRow<ipRows;ipRow++)
    {
        for(ipColumn=0;ipColumn<ipColumns;ipColumn++)
        {
```

Copyright © 1995, 1996, Xerox Corporation.    15

```
            ipAdd=inputBuff+ipScanBytes*32*ipRow+4*ipColumn;
            opRow=ipColumns-ipColumn-1;
            opColumn=ipRow;
            opAdd=outputBuff+opScanBytes*32*opRow+4*opColumn;
            rotateBlock(ipAdd,(unsigned long *)opAdd,ipScanBytes,
                    opScanBytes);
        }
    }
    startLines=ipScanBytes*8-imageIn->lineLength;
    imageOut->buffer +=startLines*opScanBytes;
    imageOut->lines=imageIn->lineLength;
    imageOut->lineLength=imageIn->lines;
}
static rotateBlock(ipStartAdd,opStartAdd,ipScanBytes,opScanBytes)
unsigned char *ipStartAdd;
unsigned long *opStartAdd;
unsigned int ipScanBytes;
unsigned int opScanBytes;
{
    unsigned long r0,r1,r2,r3,r4,r5,r6,r7;
    register unsigned long temp1,temp2;
    unsigned char *ipPtr;
    unsigned long *opPtr,d,e,f,g;
    int l;

opPtr=opStartAdd+31*(opScanBytes>>2);
#ifdef UNIX
    for(l=0;l<=3;l++)
#else
    for(l=3;l>=0;l--)
#endif
    {
        ipPtr=ipStartAdd+l;

r0 <<= 8;
            r0 +=*ipPtr;
            ipPtr +=ipScanBytes;

r1 <<= 8;
            r1 +=*ipPtr;
            ipPtr +=ipScanBytes;

r2 <<= 8;
            r2 +=*ipPtr;
            ipPtr +=ipScanBytes;

r3 <<= 8;
            r3 +=*ipPtr;
            ipPtr +=ipScanBytes;

r4 <<= 8;
            r4 +=*ipPtr;
            ipPtr +=ipScanBytes;
```

Copyright © 1995, 1996, Xerox Corporation.    16

```
r5 <<= 8;
r5 +=*ipPtr;
ipPtr +=ipScanBytes;

r6 <<= 8;
r6 +=*ipPtr;
ipPtr +=ipScanBytes;

r7 <<= 8;
r7 +=*ipPtr;
ipPtr +=ipScanBytes;

r0 <<= 8;
r0 +=*ipPtr;
ipPtr +=ipScanBytes;

r1 <<= 8;
r1 +=*ipPtr;
ipPtr +=ipScanBytes;

r2 <<= 8;
r2 +=*ipPtr;
ipPtr +=ipScanBytes;

r3 <<= 8;
r3 +=*ipPtr;
ipPtr +=ipScanBytes;

r4 <<= 8;
r4 +=*ipPtr;
ipPtr +=ipScanBytes;

r5 <<= 8;
r5 +=*ipPtr;
ipPtr +=ipScanBytes;

r6 <<= 8;
r6 +=*ipPtr;
ipPtr +=ipScanBytes;

r7 <<= 8;
r7 +=*ipPtr;
ipPtr +=ipScanBytes;

r0 <<= 8;
r0 +=*ipPtr;
ipPtr +=ipScanBytes;

r1 <<= 8;
r1 +=*ipPtr;
ipPtr +=ipScanBytes;

r2 <<= 8;
r2 +=*ipPtr;
```

Copyright © 1995, 1996, Xerox Corporation.    17

```
ipPtr +=ipScanBytes;

r3 <<= 8;
r3 +=*ipPtr;
ipPtr +=ipScanBytes;

r4 <<= 8;
r4 +=*ipPtr;
ipPtr +=ipScanBytes;

r5 <<= 8;
r5 +=*ipPtr;
ipPtr +=ipScanBytes;

r6 <<= 8;
r6 +=*ipPtr;
ipPtr +=ipScanBytes;

r7 <<= 8;
r7 +=*ipPtr;
ipPtr +=ipScanBytes;

r0 <<= 8;
r0 +=*ipPtr;
ipPtr +=ipScanBytes;

r1 <<= 8;
r1 +=*ipPtr;
ipPtr +=ipScanBytes;

r2 <<= 8;
r2 +=*ipPtr;
ipPtr +=ipScanBytes;

r3 <<= 8;
r3 +=*ipPtr;
ipPtr +=ipScanBytes;

r4 <<= 8;
r4 +=*ipPtr;
ipPtr +=ipScanBytes;

r5 <<= 8;
r5 +=*ipPtr;
ipPtr +=ipScanBytes;

r6 <<= 8;
r6 +=*ipPtr;
ipPtr +=ipScanBytes;

r7 <<= 8;
r7 +=*ipPtr;
ipPtr +=ipScanBytes;
```

Copyright © 1995, 1996. Xerox Corporation.    18

```
if((r0|r1|r2|r3|r4|r5|r6|r7)==0) goto store;

temp1=r0 & fMask1bit;
temp2=r1 & sMask1bit;
r0 = r0 & sMask1bit;
r1 = r1 & fMask1bit;
r0 = r0 << 1;
r1 = r1 >> 1;
r0 = r0 | temp2;
r1 = r1 | temp1;

temp1=r2 & fMask1bit;
temp2=r3 & sMask1bit;
r2 = r2 & sMask1bit;
r3 = r3 & fMask1bit;
r2 = r2 << 1;
r3 = r3 >> 1;
r2 = r2 | temp2;
r3 = r3 | temp1;

temp1=r4 & fMask1bit;
temp2=r5 & sMask1bit;
r4 = r4 & sMask1bit;
r5 = r5 & fMask1bit;
r4 = r4 << 1;
r5 = r5 >> 1;
r4 = r4 | temp2;
r5 = r5 | temp1;

temp1=r6 & fMask1bit;
temp2=r7 & sMask1bit;
r6 = r6 & sMask1bit;
r7 = r7 & fMask1bit;
r6 = r6 << 1;
r7 = r7 >> 1;
r6 = r6 | temp2;
r7 = r7 | temp1;

temp1 = r0 & fMask2bit;
    temp2 = r2 & sMask2bit;
    r0 = r0 & sMask2bit;
    r2 = r2 & fMask2bit;
    r0 = r0 << 2;
    r2 = r2 >> 2;
    r0 = r0 | temp2;
    r2 = r2 | temp1;

temp1 = r1 & fMask2bit;
    temp2 = r3 & sMask2bit;
    r1 = r1 & sMask2bit;
    r3 = r3 & fMask2bit;
    r1 = r1 << 2;
    r3 = r3 >> 2;
    r1 = r1 | temp2;
```

Copyright © 1995, 1996. Xerox Corporation.     19

```
        r3 = r3 | temp1;

temp1 = r4 & fMask2bit;
        temp2 = r6 & sMask2bit;
        r4 = r4 & sMask2bit;
        r6 = r6 & fMask2bit;
        r4 = r4 << 2;
        r6 = r6 >> 2;
        r4 = r4 | temp2;
        r6 = r6 | temp1;

temp1 = r5 & fMask2bit;
        temp2 = r7 & sMask2bit;
        r5 = r5 & sMask2bit;
        r7 = r7 & fMask2bit;
        r5 = r5 << 2;
        r7 = r7 >> 2;
        r5 = r5 | temp2;
        r7 = r7 | temp1;

temp1 = r0 & fMask4bit;
temp2 = r4 & sMask4bit;
r0 = r0 & sMask4bit;
r4 = r4 & fMask4bit;
r0 = r0 << 4;
r4 = r4 >> 4;
r0 = r0 | temp2;
r4 = r4 | temp1;

temp1 = r1 & fMask4bit;
temp2 = r5 & sMask4bit;
r1 = r1 & sMask4bit;
r5 = r5 & fMask4bit;
r1 = r1 << 4;
r5 = r5 >> 4;
r1 = r1 | temp2;
r5 = r5 | temp1;

temp1 = r2 & fMask4bit;
temp2 = r6 & sMask4bit;
r2 = r2 & sMask4bit;
r6 = r6 & fMask4bit;
r2 = r2 << 4;
r6 = r6 >> 4;
r2 = r2 | temp2;
r6 = r6 | temp1;

temp1 = r3 & fMask4bit;
temp2 = r7 & sMask4bit;
r3 = r3 & sMask4bit;
r7 = r7 & fMask4bit;
r3 = r3 << 4;
r7 = r7 >> 4;
r3 = r3 | temp2;
```

Copyright © 1995, 1996. Xerox Corporation.    20

```
                r7= r7 | temp1;
store:
                SWAPWORD(r7);
                *opPtr=r7;
                opPtr -=(opScanBytes>>2);

SWAPWORD(r6);
                *opPtr=r6;
                opPtr -=(opScanBytes>>2);

SWAPWORD(r5);
                *opPtr=r5;
                opPtr -=(opScanBytes>>2);

SWAPWORD(r4);
                *opPtr=r4;
                opPtr -=(opScanBytes>>2);

SWAPWORD(r3);
                *opPtr=r3;
                opPtr -=(opScanBytes>>2);

SWAPWORD(r2);
                *opPtr=r2;
                opPtr -=(opScanBytes>>2);

SWAPWORD(r1);
                *opPtr=r1;
                opPtr -=(opScanBytes>>2);

SWAPWORD(r0);
                *opPtr=r0;
                opPtr -=(opScanBytes>>2);
        }
} void rotate(imageIn,imageOut,error)
image *imageIn;
image *imageOut;
errorType *error;
{
    unsigned long *ipBuffer,*opBuffer,*lineStart,*lineEnd,*opStart,
        tempopBuffer[100000],*tempPtr;
    unsigned short change[6600],*changePtr;
    unsigned int ipLines,ipLineLength,opLines,opLineLength,
        ipLineNo,opLineNo,ipLineBase;
    unsigned int longsInIpLine,longsInOpLine,bitPos;
    /*int bitPosLast;*/
    char bitNo;
    unsigned long outWord,*wordOffset,*offset,temp;
    unsigned long *ptr;
    if(imageIn->bitsPerPixel!=1)
```

Copyright © 1995, 1996. Xerox Corporation.    21

```
{
    rotateAntiClockGrey(imageIn,imageOut,error);
    return;
}
ipLines=rnd32(imageIn->lines);
ipLineLength=rnd32(imageIn->lineLength);
opLines=ipLineLength;
opLineLength=ipLines;

*imageOut=imageMallocZero(opLines,opLineLength,error);
imageOut->resolution=imageIn->resolution;
imageOut->orientation=imageIn->orientation;
if(*error!=ERROR_OK)
{
    return;
}
ipBuffer=imageIn->buffer;
opBuffer=imageOut->buffer;
for(ptr=ipBuffer+(imageIn->lines)*ipLineLength/32;ptr<ipBuffer+
        ipLineLength/32*ipLines;ptr++)
    *ptr=0;
longsInIpLine=rnd32(ipLineLength)/32;
longsInOpLine=rnd32(opLineLength)/32;
for(opLineNo=0;opLineNo<=opLines;opLineNo++)
{
    tempopBuffer[opLineNo]=0;
}
for(ipLineBase=0;ipLineBase<ipLines;ipLineBase+=32)
{
    outWord=((unsigned long)0x80000000);
    for(ipLineNo=ipLineBase;ipLineNo<ipLineBase+32;ipLineNo++)
    {
        lineStart=ipBuffer+ipLineNo*longsInIpLine;
        lineEnd=lineStart+longsInIpLine;
        getChanges(lineStart,lineEnd,change,ipLineLength);
        changePtr=change;
            /*bitPosLast=-1;*/
        while((bitPos=*changePtr)<ipLineLength)
        {
            wordOffset=tempopBuffer+(ipLineLength-bitPos-1);
            *wordOffset=*wordOffset|outWord;
            changePtr++;

}
        outWord=outWord>>1;
    }
    offset=opBuffer+ipLineBase/32+longsInOpLine*(opLines-1);
    temp=0;
    tempPtr=tempopBuffer+opLines-1;
    for(opLineNo=0;opLineNo<opLines;opLineNo++)
    {
        temp=temp^*tempPtr;
        *offset=temp;
        offset-=longsInOpLine;
```

Copyright © 1995, 1996, Xerox Corporation.    22

```
        *tempPtr=0;
        tempPtr--;
    }
}
imageOut->lines=imageIn->lineLength;
imageOut->lineLength=imageIn->lines;
imageOut->buffer+=(opLines-imageOut->lines)*longsInOpLine*4;
} include <stdio.h>
include "improc.h"
#define fMask1bit 0xaaaaaaaa
#define sMask1bit 0x55555555
#define fMask2bit 0xcccccccc
#define sMask2bit 0x33333333
#define fMask4bit 0xf0f0f0f0
#define sMask4bit 0x0f0f0f0f
#define SWAPWORD
image imageMalloc();
image imageMallocZero();
void render();
#define setBit(buffer,lineLongs,bitNo,offset,line)        \
        {                                                 \
            unsigned long outWord,*wordOffset;            \
            outWord=((unsigned long)0x80000000)>>bitNo;   \
            wordOffset=buffer+(line)*lineLongs+offset;    \
            *wordOffset=*wordOffset|outWord;              \
        } rotatecw1(imageIn,imageOut,error)
image *imageIn;
image *imageOut;
errorType *error;
{
    unsigned char *ipAdd;
    unsigned char *opAdd;
    char *inputBuff,*outputBuff,*ptr;
    int ipScanLines;
    unsigned int ipRow,ipColumn,opRow,opColumn,ipRows,ipColumns;
    unsigned int opScanBytes;
    unsigned int ipScanBytes;
    if(imageIn->bitsPerPixel!=1)
    {
        rotateClockGrey(imageIn,imageOut,error);
        return;
    }   ipScanBytes=rnd32(imageIn->lineLength)/8;
    ipScanLines=((imageIn->lines+31)/32)*32;
    inputBuff=(char *)(imageIn->buffer
                -ipScanBytes*(ipScanLines-imageIn->lines));

for(ptr=inputBuff;ptr<imageIn->buffer;ptr++)
```

Copyright © 1995, 1996. Xerox Corporation.     23

```
            *ptr=0;
/*      for(ptr=inputBuff+(imageIn->lines)*ipScanBytes;ptr<inputBuff+
            ipScanBytes*ipScanLines;ptr++)
            *ptr=0;  */
        opScanBytes=ipScanLines/8;
        ipRows=(ipScanLines+31)/32;
        ipColumns=(ipScanBytes+3)/4;
        *imageOut=imageMalloc(imageIn->lineLength,ipScanLines,error);
        if (*error!=ERROR_OK) return;
        outputBuff=(char *)(imageOut->buffer);
        imageOut->resolution=imageIn->resolution;
        imageOut->orientation=imageIn->orientation;
        imageClear(imageOut);
        for(ipRow=0;ipRow<ipRows;ipRow++)
        {
            for(ipColumn=0;ipColumn<ipColumns;ipColumn++)
            {
                ipAdd=inputBuff+ipScanBytes*32*ipRow+4*ipColumn;
                opRow=ipColumn;
                opColumn=ipRows-ipRow-1;
                opAdd=outputBuff+opScanBytes*32*opRow+4*opColumn;
                rotateBlock(ipAdd,(unsigned long *)opAdd,
                    opScanBytes,ipScanBytes);
            }
        }
        imageOut->lines=imageIn->lineLength;
        imageOut->lineLength=imageIn->lines;
} static rotateBlock(ipStartAdd,opStartAdd,opScanBytes,ipScanBytes)
unsigned char *ipStartAdd;
unsigned long *opStartAdd;
unsigned int opScanBytes;
unsigned int ipScanBytes;

{
        unsigned long r[8],temp1,temp2;
        unsigned char *ipPtr;
        unsigned long *opPtr,d,e,f,g;
        int n,m,l,p;

/*      opPtr=opStartAdd+32*(opScanBytes>>2);*/
        opPtr=opStartAdd;
#ifdef UNIX
        for(l=0;l<=3;l++)
#else
        for(l=3;l>=0;l--)
#endif
        {
            ipPtr=ipStartAdd+l+31*ipScanBytes;
            for(m=0;m<=3;m++)
            {
                for(n=7;n>=0;n--)
```

Copyright © 1995, 1996. Xerox Corporation.    24

```
            {
                r[n] <<= 8;
                r[n] +=*ipPtr;
                ipPtr -=ipScanBytes;
            }
    }
    for (n=0;n<=6;n +=2)
    {
        temp1=r[n] & sMask1bit;
        temp2=r[n+1] & fMask1bit;
        r[n] = r[n] & fMask1bit;
        r[n+1] = r[n+1] & sMask1bit;
        r[n] = r[n] >> 1;
        r[n+1] = r[n+1] << 1;
        r[n] = r[n] | temp2;
        r[n+1] = r[n+1] | temp1;
    }
    for (m=0;m<=4;m +=4)
    {
        for (n=0;n<=1;n++)
        {
            temp1 = r[m+n] & sMask2bit;
            temp2 = r[m+n+2] & fMask2bit;
            r[m+n] = r[m+n] & fMask2bit;
            r[m+n+2] = r[m+n+2] & sMask2bit;
            r[m+n] = r[m+n] >> 2;
            r[m+n+2] = r[m+n+2] << 2;
            r[m+n] = r[m+n] | temp2;
            r[m+n+2]= r[m+n+2] | temp1;
        }
    }
    for (n=0;n<=3;n++)
    {
        temp1 = r[n] & sMask4bit;
        temp2 = r[n+4] & fMask4bit;
        r[n] = r[n] & fMask4bit;
        r[n+4] = r[n+4] & sMask4bit;
        r[n] = r[n] >> 4;
        r[n+4] = r[n+4] << 4;
        r[n] = r[n] | temp2;
        r[n+4]= r[n+4] | temp1;
    }
    for (n=0;n<=7;n++)
    {
        SWAPWORD(r[n]);
        *opPtr=r[n];
        opPtr +=(opScanBytes>>2);
    }
  }
}
```

Copyright © 1995, 1996, Xerox Corporation.      25

```
void rotateccw(imageIn,imageOut,error)
image *imageIn;
image *imageOut;
errorType *error;
{
    unsigned long *ipBuffer,*opBuffer,*lineStart,*lineEnd,*opStart,
        tempopBuffer[100000],*tempPtr,*ptr;
    unsigned short change[6600],*changePtr;
    unsigned int ipLines,ipLineLength,opLines,opLineLength,
        ipLineNo,opLineNo,ipLineBase;
    unsigned int longsInIpLine,longsInOpLine,bitPos;
    char bitNo;
    unsigned long outWord,*wordOffset,*offset,temp;

if(imageIn->bitsPerPixel!=1)
    {
        rotateClockGrey(imageIn,imageOut,error);
        return;
    }
    ipLines=imageIn->lines;
    ipLineLength=rnd32(imageIn->lineLength);
    opLines=ipLineLength;
    opLineLength=ipLines;
    ipLines=rnd32(ipLines);
    *imageOut=imageMalloc(opLines,opLineLength,error);
    imageOut->resolution=imageIn->resolution;
    imageOut->orientation=imageIn->orientation;
    if(*error!=ERROR_OK)
    {
        return;
    }
    ipBuffer=imageIn->buffer;
    ipBuffer=(unsigned long *)(imageIn->buffer
            -((rnd32(ipLineLength))/8)*(ipLines-imageIn->lines));
    for(ptr=ipBuffer;ptr<imageIn->buffer;ptr++)
            *ptr=0;
    opBuffer=imageOut->buffer;

longsInIpLine=rnd32(ipLineLength)/32;
    longsInOpLine=rnd32(opLineLength)/32;
    for(opLineNo=0;opLineNo<opLines;opLineNo++)
    {
        tempopBuffer[opLineNo]=0;
    }
    for(ipLineBase=0;ipLineBase<ipLines;ipLineBase+=32)
    {
        outWord=((unsigned long)0x1);
        for(ipLineNo=ipLineBase;ipLineNo<ipLineBase+32;ipLineNo++)
        {
            lineStart=ipBuffer+ipLineNo*longsInIpLine;
```

```
            lineEnd=lineStart+longsInIpLine;
            getChanges(lineStart,lineEnd,change,ipLineLength);
            changePtr=change;
            while((bitPos=*changePtr)<ipLineLength)
            {
                wordOffset=tempopBuffer+bitPos;
                *wordOffset=*wordOffset|outWord;
                changePtr++;
            }
            outWord=outWord<<1;
        }
        offset=opBuffer+(ipLines-ipLineBase-32)/32;
        temp=0;
        tempPtr=tempopBuffer;
        for(opLineNo=0;opLineNo<opLines;opLineNo++)
        {
            temp=temp^*tempPtr;
            *offset=temp;
            offset+=longsInOpLine;
            *tempPtr=0;
            tempPtr++;
        }
    }
    imageOut->lines=imageIn->lineLength;
} include <stdio.h>
include "improc.h"
#define nextColor(x) (x^1)
#define white 0
#define black 1
#define TRUE 1
#define FALSE 0
#define GETBYTE0(input)         \
        (inWord&0xff)

#define GETBYTE1(input)         \
        ((inWord&0xff00)>>8)

#define GETBYTE2(input)         \
        ((inWord&0xff0000)>>16)

#define GETBYTE3(input)         \
        ((inWord&0xff000000)>>24)

/*#define UNIX*/
static long btab[256]=
{
#include "stb.h"
};
static long wtab[256]=
{
#include "stw.h"
};
```

Copyright © 1995, 1996. Xerox Corporation.      27

```
extern int line;
void getChanges (input1,end1,change1,lineLength)
char *input1;
char *end1;
short *change1;
unsigned int lineLength;
{
        register char *input;
        register char *end;
        register short *change;
        register char color;
        register unsigned char index0,index1,index2,index3;
        register int total;
        register int count;
        register long entry,inWord;
        int scanBytes;
        input=input1;
        end=end1;
        change=change1;
        scanBytes=end-input;
        color=white;
        change[0]=0;
lnext1:
                if(color==white)
                {
lwhite1:
                        while((inWord=*(unsigned long *)input)==0)
                        {
                                *change +=32;
                                input +=4;
                                if (input>=end)
                                        goto lout;
                        }
                        input+=4;
                        index3=GETBYTE3(input);
                        total=0;
                        if(!index3)
                        {
                                *change +=8;
                                goto lwhite2;
                        }
                        else if (index3==0xaa)
                        {
                                entry=0x11111111;
                                count=0;
                /*color=nextColor(color);*/
                                goto loop21;
                        }
                        entry=*(wtab+index3);
                }
                else
                {
                        inWord=*(unsigned long *)input;
```

Copyright © 1995, 1996. Xerox Corporation.       28

```
                        input+=4;
                        index3=GETBYTE3(input);
/*                      if(index!=index1) printf("NE at 0b %x %x\n",index,index1);*/
                        total=0;
                        if (index3==0x55)
                        {
                                entry=0x11111111;
                                count=0;
                                /**(change+1)=*change;
                                change++;

color=nextColor(color);*/
                                goto loop21;
                        }
                        entry=*(btab+index3);
            }
loop1:
                        count=entry&0xf;
                        entry >>=4;
loop21:     *change=*change+count;
                        total +=count;
                        if (total==8) goto lbreak1;
                        *(change+1)=*change;
                        change++;
                        color=nextColor(color);
                        goto loop1;
lbreak1:

/*lnext2:*/  /*joe*/
            if(color==white)
            {
lwhite2:
                        index2=GETBYTE2(input);

total=0;
                        if(!index2)
                        {
                                *change +=8;
                                goto lwhite3;
                        }
                        else if (index2==0xaa)
                        {
                                entry=0x11111111;
                                count=0;
            /*color=nextColor(color);*/
                                goto loop22;
                        }
                        entry=*(wtab+index2);
            }
            else
            {
```

```
                              index2=GETBYTE2(input);

total=0;
                              if (index2==0x55)
                              {
                                       entry=0x11111111;
                                       count=0;
                                       /**(change+1)=*change;
                                        change++;
                              color=nextColor(color);*/
                                       goto loop22;
                              }
                              entry=*(btab+index2);
               }
loop2:
                              count=entry&0xf;
                              entry >>=4;
loop22:   *change=*change+count;
                              total +=count;
                              if (total==8) goto lbreak2;
                              *(change+1)=*change;
                              change++;
                              color=nextColor(color);
                              goto loop2;
lbreak2:

/*lnext3:*/        /*joe*/
                   if(color==white)
                   {
lwhite3:
#ifdef UNIX
                              if(((int)input)%4==0)
#endif
                              index1=GETBYTE1(input);

total=0;
                              if(!index1)
                              {
                                       *change +=8;
                                       goto lwhite4;
                              }
                              else if (index1==0xaa)
                              {
                                       entry=0x11111111;
                                       count=0;
                              /*color=nextColor(color);*/
                                       goto loop23;
                              }
                              entry=*(wtab+index1);
                   }
```

Copyright © 1995, 1996. Xerox Corporation.        30

```
                else
                {
                        index1=GETBYTE1(input);

total=0;
                        if (index1==0x55)
                        {
                                entry=0x11111111;
                                count=0;
                                /**(change+1)=*change;
                                change++;

color=nextColor(color);*/
                                goto loop23;
                        }
                        entry=*(btab+index1);
                }
loop3:
                        count=entry&0xf;
                        entry >>=4;
loop23: *change=*change+count;
                        total +=count;
                        if (total==8) goto lbreak3;
                        *(change+1)=*change;
                        change++;
                        color=nextColor(color);
                        goto loop3;
lbreak3:

/*lnext4:*/     /*joe*/
                if(color==white)
                {
lwhite4:
#ifdef UNIX
                        if(((int)input)%4==0)
#endif
                        index0=GETBYTE0(input);

total=0;
                        if(!index0)
                        {
                                *change +=8;
                                goto lwhite1;
                        }
                        else if (index0==0xaa)
                        {
                                entry=0x11111111;
                                count=0;
```

Copyright © 1995, 1996, Xerox Corporation.    31

```
                        /*color=nextColor(color);*/
                                        goto loop24;
                                }
                                entry=*(wtab+index0);
                        }
                        else
                        {
                                index0=GETBYTE0(input);

total=0;
                                if (index0==0x55)
                                {
                                        entry=0x11111111;
                                        count=0;
                        /*color=nextColor(color);
                                        *(change+1)=*change;
                                        change++;*/
                                        goto loop24;
                                }
                                entry=*(btab+index0);
                        }
loop4:
                                count=entry&0xf;
                                entry >>=4;
loop24:         *change=*change+count;
                                total +=count;
                                if (total==8) goto lbreak4;
                                *(change+1)=*change;
                                change++;
                                color=nextColor(color);
                                goto loop4;
lbreak4:
                                if (input>=end) goto lout;
                                goto lnext1;

lout:
        while (*change>lineLength) change--;
        change++;
        *change=lineLength;
/*      printf("last-1 = %d last = %d lineLength = %d\n",
                        *(change-1),*change,lineLength);*/
        change++;
        *change=lineLength;
        change++;
        *change=lineLength;
        change++;
} void initRun()          /*joe*/
{
} void printLine(input,end) /*joe*/
```

Copyright © 1995, 1996. Xerox Corporation.     32

```
unsigned char *input,*end;
{
/*      printf("input=%lx end=%lx\n",input,end);
        while (input<=end)
        {
                printf("%x\n",*input);
                input++;
        }*/
} getChangesInImage(imageIn,lineNumber,changePtr)
image imageIn;
int lineNumber;
short *changePtr;
{
        char *start,*end;
        unsigned int lineLength,bytesInLine,allignedBytesInLine;
        lineLength=imageIn.lineLength;
        bytesInLine=((lineLength/8)*8)/8;
        allignedBytesInLine=rnd32(lineLength)/8;
        start=imageIn.buffer+lineNumber*allignedBytesInLine;
        end=start+bytesInLine;
        getChanges (start,end,changePtr,lineLength);

}
```

Copyright © 1995, 1996. Xerox Corporation.        33

I claim:

1. A method, operating on a programmable data processing system, for rotating an image represented as a run length encoded data stream while decoding the run length encoded data stream, comprising:

(a) resetting, in a memory associated with the data processing system, a plurality of contiguous memory locations to zero;

(b) setting, in response to the run length encoded data stream, each bit in the contiguous memory indicating a beginning of each of a plurality of runs of a continuous color, wherein the bits set are ordered in a direction orthogonal to a direction in which the run length encoded data stream was encoded; and (c) resetting a register to zero;

(d) exclusive ORing the contents of the register with a selected word in the contiguous memory;

(e) writing the contents of the register to the selected word in the contiguous memory; and (f) selecting an immediately following contiguous memory location as the selected word and repeating steps (d) and (e) until all contiguous memory locations have been processed, the contiguous memory locations being words;

said step (b) including the substeps of, (b1) shifting a single-bit mask to a bit position corresponding to a current raster of run length encoded data, and (b2) addressing a word within the cache memory and ORing the word with the single-bit mask to set a bit indicating the end of a run.

2. The method of claim 1, wherein the words contain at least 32 bits.

3. An apparatus for rotating a run length encoded data stream while decoding the same, comprising:

a buffer for storing at least a portion of the run length encoded data stream;

a cache memory comprising a plurality of contiguous memory locations;

decoding means for determining the length of a run of pixels encoded in a first direction;

means, responsive to the length of the run determined by said decoding means, for setting a bit in a word and bit location of said cache memory, wherein the word and bit location are determined as a function of the run length and the determined length of the run of pixels;

means for EXCLUSIVE ORing a first of the contiguous memory locations with zero and writing the result thereto; and means for successively EXCLUSIVE ORing each contiguous memory location with an immediately preceding contiguous memory location and writing the result to the contiguous memory location until all of the contiguous memory locations have been so processed, where the contiguous memory locations represent the rotated and decompressed image;

said means for setting a bit in a word and bit location of said cache memory including, a single-bit mask shiftable to a bit position corresponding to a current raster of run length encoded data, and an address generator for addressing a word within the cache memory and ORing the word with the single-bit mask to set a bit within the word indicating the end of a run.

4. The apparatus of claim 3, wherein said cache memory comprises a plurality of contiguous words.

5. The apparatus of claim 3, wherein the words comprise at least 32 bits.

6. The apparatus of claim 3, wherein said means for EXCLUSIVE ORing a first of the contiguous memory locations with zero comprises:

a first CPU register;

means for setting the value of the register to zero;

an address generator for addressing the first of the contiguous memory locations;

means for EXCLUSIVE ORing a value stored in the location addressed by the address generator with the CPU register and storing the result in the CPU register; and a bus for transferring the contents of the CPU register to the location addressed by the address generator.

7. The apparatus of claim 6, wherein said means for successively EXCLUSIVE ORing each contiguous memory location with an immediately preceding contiguous memory location comprises:

an address generator for repeatedly addressing subsequent contiguous memory locations;

means for EXCLUSIVE ORing a value stored in the subsequent memory location addressed by the address generator with the CPU register and storing the result in the CPU register; and a bus for transferring the contents of the CPU register to the subsequent memory location addressed by the address generator.

* * * * *